(12) United States Patent
Nakagawa et al.

(10) Patent No.: US 6,649,701 B1
(45) Date of Patent: *Nov. 18, 2003

(54) POLYMER AND PROCESS FOR PRODUCING POLYMER

(75) Inventors: Yoshiki Nakagawa, Kobe (JP); Nao Fujita, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/647,171

(22) PCT Filed: Mar. 29, 1999

(86) PCT No.: PCT/JP99/01590
§ 371 (c)(1),
(2), (4) Date: Nov. 20, 2000

(87) PCT Pub. No.: WO99/50315
PCT Pub. Date: Oct. 7, 1999

(30) Foreign Application Priority Data

Mar. 27, 1998 (JP) .............................. 10-100359

(51) Int. Cl.$^7$ .............................. C08F 8/00; C08F 2/00; C08F 246/00; C08L 57/00
(52) U.S. Cl. ................. 525/245; 525/284; 525/298; 525/301; 525/313; 525/319; 526/90
(58) Field of Search ................. 525/245, 284, 525/298, 301, 313, 319; 526/90

(56) References Cited

U.S. PATENT DOCUMENTS

| 5,763,548 A | 6/1998 | Matyjaszewski et al. ... 526/135 |
| 5,789,487 A | 8/1998 | Matyjaszewski et al. ... 525/301 |
| 5,807,937 A | 9/1998 | Matyjaszewski et al. ... 526/135 |
| 6,482,900 B1 * | 11/2002 | Nakagawa et al. ......... 525/319 |

FOREIGN PATENT DOCUMENTS

| EP | 0 789 036 A2 | 8/1997 |
| EP | 0 816 385 A1 | 1/1998 |
| WO | WO 96/30421 | 10/1996 |
| WO | WO 97/18247 | 5/1997 |
| WO | WO 98/01480 | 1/1998 |
| WO | WO 98/40415 | 9/1998 |

* cited by examiner

Primary Examiner—James J. Seidleck
Assistant Examiner—Olga Asinovsky
(74) Attorney, Agent, or Firm—Connolly Bove Lodge & Hutz LLP

(57) ABSTRACT

The present invention has for its object to provide a polymer available upon coupling of polymers of radical-polymerizable olefin monomer or monomers and a process for producing said polymer.

The present invention is concerned with a method for effecting polymer-polymer coupling in the living radical polymerization of a radical-polymerizable olefin monomer which comprises adding a compound having at least two sparingly radical-polymerizable alkenyl groups during or after polymerization.

22 Claims, No Drawings

POLYMER AND PROCESS FOR PRODUCING POLYMER

TECHNICAL FIELD

The present invention relates to a polymer of a radical-polymerizable olefin monomer and a method of producing the same.

BACKGROUND ART

The art of coupling polymer extension ends to produce a long-chain polymer is known. In the case of anionic polymerization, coupling can be effected by adding a compound having two electrophilic functional groups. In the case of cationic polymerization, coupling can be effected by adding a compound having two nucleophilic functional groups.

Meanwhile, it is known that a polymer having a terminal functional group crosslinks by itself or in the presence of a suitable curing agent to give a cured product of high heat resistance and durability. Typical of the polymer of this kind has a terminal hydroxyl or crosslinkable silyl group. The hydroxy-terminated polymer can be crosslinked and cured by using a polyfunctional isocyanate compound as the curing agent. The crosslinkable silyl-terminated polymer gives a cured product by absorbing moisture in the presence of a suitable condensation catalyst.

The backbone skeleton of such a polymer having a terminal hydroxyl or crosslinkable silyl group may for example comprise a polyether polymer such as polyethylene oxide, polypropylene oxide, polytetramethylene oxide or the like, a hydrocarbon polymer such as polybutadiene, polyisoprene, polychloroprene, polyisobutylene or the like inclusive of the hydrogenation product thereof, or a polyester polymer such as polyethylene terephthalate, polybutylene terephthalate, polycaprolactone or the like. Depending on the backbone skeletal structure and the mode of crosslinking, those polymers have been used in various applications.

The art of coupling the molecular ends of vinyl polymers obtainable by radical polymerization, as contrasted to said coupling by ionic polymerization or polycondensation, has not been fully established on a commercial scale as yet. Unlike in ionic polymerization, the direct coupling of radicals at the polymer propagation end is theoretically feasible in radical polymerization but because the radical polymerization reaction itself may be controlled only with considerable difficulty, it is not easy to control the coupling reaction.

Among vinyl polymers, (meth)acrylic polymers have certain characteristics, such as high weathering resistance and high clarity, which are not found in said polyether, hydrocarbon and polyester polymers. Particularly (meth)acrylic polymers having an alkenyl or crosslinkable silyl group in the side chain have been utilized in super-weather-resistant paints. Nevertheless, control of polymerization in the case of acrylic polymers is not easy owing to side reactions involved and, as a corollary, the coupling of polymer propagation ends is extremely difficult.

As advantages of the coupling reaction, there can be mentioned the increase in molecular weight by chain extension, the synthesis of block copolymers, and the synthesis of polymers having terminal functional groups. As coupling occurs, the molecular weight is increased two-fold in the case of a polymer having one propagation end and theoretically infinitely when the polymer has two propagation ends. When a diblock copolymer synthesized by serial addition of monomers is caused to undergo coupling, an ABA triblock copolymer is synthesized. In the case of a polymer that is polymerized using a functional group-containing initiator, coupling of propagation ends yields a polymer having a functional group at both terminals.

Compared with a vinyl polymer having a crosslinkable functional group in the side chain, a vinyl polymer having a crosslinkable functional group at both terminals yields a cured product with superior physical properties. Therefore, many workers have been exploring for an expedient technology for producing such polymers but it is not easy to produce them on a commercial scale. Japanese Kokai Publication Hei-5-255415 discloses a process for producing a (meth)acrylic polymer having an alkenyl group at both terminals which is characterized in that an alkenyl group-containing disulfide is used as the chain transfer agent. Japanese Kokai Publication Hei-5-262808 discloses a process which comprises synthesizing a (meth)acrylic polymer having a hydroxyl group at both terminals by using a hydroxyl group-containing disulfide and, by exploiting the reactivity of hydroxyl groups, synthesizing a (meth)acrylic polymer having an alkenyl group at both terminals. However, these processes are not easily amenable to polymer molecular weight control. Furthermore, in order that a functional group may be certainly introduced into every terminal position, the chain transfer agent must be used in a large amount so that said processes are not fully satisfactory in terms of process control.

SUMMARY OF THE INVENTION

In view of the above state of the art, the present invention has for its object to provide a polymer available upon coupling of polymers of radical-polymerizable olefin monomer or monomers and a process for producing said polymer.

The present invention, therefore, is concerned with a method for effecting polymer-polymer coupling in the living radical polymerization of a radical-polymerizable olefin monomer which comprises adding a compound having at least two sparingly radical-polymerizable alkenyl groups during or after polymerization.

The compound having at least two sparingly radical-polymerizable alkenyl groups to be thus added is preferably a compound of the general formula (1):

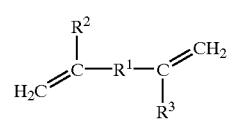

wherein $R^1$ represents a divalent or polyvalent saturated hydrocarbon group of 1 to 20 carbon atoms or a group represented by the following general formula (2):

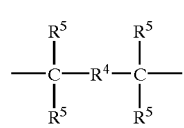

wherein $R^4$ represents an oxygen atom, a nitrogen atom or a divalent or polyvalent organic group containing 1 to 20 carbon atoms; $R^5$ represents a hydrogen atom or a methyl group; 4 $R^5$s may be the same or different; $R^2$ and $R^3$ are the same or different and each represents a hydrogen atom or a methyl group.

The more preferred is a compound of the general formula (1)

wherein $R^1$ is preferably an alkylene group of 1 to 20 carbon atoms, and still more preferred is a compound of the general formula (3):

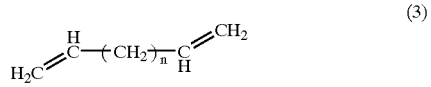

(3)

wherein n represents an integer of 1 to 20.

As specific examples, 1,5-hexadiene, 1,7-octadiene and 1,9-decadiene can be mentioned.

The living radical polymerization in the present invention is preferably atom transfer radical polymerization.

The catalyst for atom transfer radical polymerization preferably comprises a metal complex, said metal complex having the central metal selected from an element belonging to the group 7, 8, 9, 10 or 11 of the periodic table of the elements, more preferably a complex of a metal selected from the group consisting of copper, nickel, ruthenium and iron, particularly a copper complex.

The radical-polymerizable olefin monomer for use in the present invention is preferably an α, β-unsaturated carboxylic acid series monomer, more preferably a (meth)acrylic monomer, still more preferably an acrylic monomer, still more preferably an acrylate monomer, and most preferably butyl acrylate.

The initiator for atom transfer radical polymerization is preferably a functional group-containing organohalogen compound or a functional group-containing halosulfonyl compound, where the functional group is preferably a hydroxyl group or a hydrolyzable silyl group.

The present invention is further concerned with a polymer as obtainable by the method of the present invention.

The polymer as obtainable by the present invention is not particularly restricted but is preferably a polymer having a group of the general formula (4):

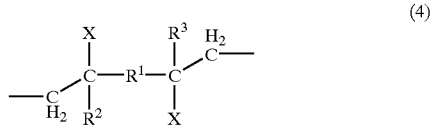

(4)

wherein $R^1$ represents a divalent or polyvalent saturated hydrocarbon group containing 1 to 20 carbon atoms or a group of the general formula (5):

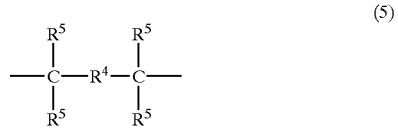

(5)

wherein $R^4$ represents an oxygen atom, a nitrogen atom, or a divalent or polyvalent organic group containing 1 to 20 carbon atoms; $R^5$ represents a hydrogen atom or a methyl group, and 4 $R^5$s may be the same or different; $R^2$ and $R^3$ are the same or different and each represents a hydrogen atom or a methyl group; X represents halogen, a nitroxide group, a sulfide group or a cobalt porphyrin complex.

DETAILED DESCRIPTION OF THE INVENTION

The present invention is concerned with a method for polymer-polymer coupling in the living radical polymerization of a radical-polymerizable olefinic monomer which comprises adding a compound having at least two sparingly radical-polymerizable alkenyl groups during or after polymerization.

The sparingly radical-polymerizable alkenyl group means an alkenyl group not activated by a carboxyl, phenyl or the like group, and may be any of a terminal olefinic group, an internal olefinic group and a cyclic olefinic group, although a terminal olefinic group is preferred.

The compound having at least two sparingly radical-polymerizable alkenyl groups to be thus added is not restricted but preferably a compound of the general formula (1):

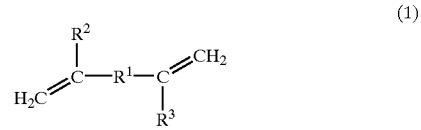

(1)

wherein $R^1$ represents a divalent or polyvalent saturated hydrocarbon group of 1 to 20 carbon atoms or a group represented by the general formula (2):

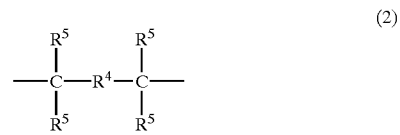

(2)

wherein $R^1$ represents an oxygen atom, a nitrogen atom or a divalent or polyvalent organic group containing 1 to 20 carbon atoms; $R^5$ represents a monovalent group, preferably a hydrogen atom or a methyl group; 4 $R^5$s may be the same or different; $R^2$ and $R^3$ are the same or different and each represents a hydrogen atom or a methyl group.

The divalent or polyvalent saturated hydrocarbon group of 1 to 20 carbon atoms as mentioned above for $R^1$ is not particularly restricted but includes alkylene groups such as methylene, ethylene, propylene, butylene, pentylene, etc. and trivalent saturated hydrocarbon groups such as methine, ethanetriyl, propanetriyl, etc. The divalent or polyvalent saturated hydrocarbon group of 1 to 20 carbon atoms is not restricted to a straight-chain group but may be a branched-chain group or a cyclic group.

When $R^1$ is a saturated hydrocarbon group having a valence number of 3 or more, the compound represented by the above general formula (1) has a structure such that an alkenyl group of the formula —C($R^2$)=CH$_2$ branches out from $R^1$. In such a branched alkenyl group, $R^2$ may be similar or dissimilar to $R^2$ and $R^3$ in the formula (1).

Referring to the general formula (2), $R^4$ represents an oxygen atom, a nitrogen atom or a divalent or polyvalent organic group containing 1 to 20 carbon atoms. The divalent or polyvalent organic group containing 1 to 20 carbon atoms is not particularly restricted but includes divalent organic groups such as —CH$_2$—O—CH$_2$—, —CH$_2$—NH—CH$_2$—, —CH$_2$C(O)O—, phenylene, etc. and trivalent organic groups such as phenyllysine. The divalent or polyvalent organic group containing 1 to 20 carbon atoms may contain an oxygen and/or nitrogen atom and may also contain an aryl and/or heteroaryl group.

When, in the above general formula (2), $R^4$ represents a nitrogen-containing group, the compound of said general formula (1) may have a structure such that an alkenyl group of $-C(R^2)=CH_2$ branches out from the nitrogen atom of $R^4$. When $R^4$ is a trivalent or polyvalent organic group, the compound of the general formula (1) has a structure such that one or more alkenyl groups of the formula $-C(R^2)=CH_2$ branch out from $R^4$. In such a branched alkenyl group, $R^2$ may be similar or dissimilar to $R^2$ and $R^3$ in the formula (1).

The above $R^5$ represents a monovalent group, preferably a hydrogen atom or a methyl group, and 4 $R^5$s may be the same or different. The group represented by the above general formula (2) preferably includes the following:

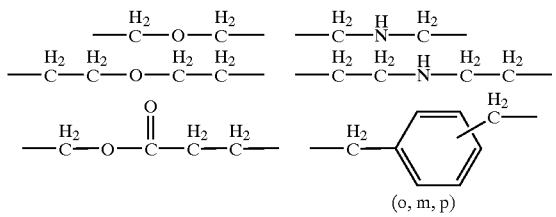

The compound having at least two sparingly radical-polymerizable alkenyl groups is more preferably a compound of the general formula (1) wherein $R^1$ is an alkylene group of 1 to 20 carbon atoms, still more preferably a compound represented by the general formula (3):

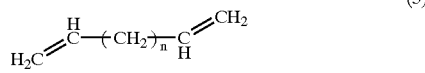

(3)

wherein n is an integer of 1 to 20.

The specific compound having at least two sparingly radical-polymerizable alkenyl groups is not particularly restricted but includes, among others, 1,5-hexadiene, 1,7-octadiene, 1,9-decadiene, 1,7-octadien-3-ol and its derivatives.

The living radical polymerization which is utilized in the practice of the invention is now described.

The "living radical polymerization method" belongs to the category of radical polymerization technology which is hardly controllable because of the high polymerization velocity and the tendency toward termination owing to mutual coupling of radicals but is a method which is less liable to stop said reaction and gives a polymer with a narrow molecular weight distribution (Mw/Mn=ca 1.1 to 1.5) with the additional advantage that the molecular weight can be freely controlled by judicious selection of the monomer-initiator feed ratio.

Thus, the "living radical polymerization method" is not only capable of giving a polymer of narrow molecular weight distribution and low viscosity but also capable of introducing a monomer having a defined functional group substantially into the desired position of the polymer and, in this sense, it is a more preferred method for producing a vinyl polymer having a defined functional group.

It should be understood that while "living polymerization" in a strict sense of the term means a polymerization reaction in which the molecular chain extends with its end continuing to be active, generally the term is also used to mean a pseudo-living polymerization reaction in which the molecule continues to grow while polymers with inactivated ends and polymers with activated ends exist in an equilibrium state. The latter definition applies to the present invention as well.

The "living radical polymerization method" has been studied enthusiastically by many research groups in recent years. For example, the process using a cobalt porphyrin complex as described in Journal of American Chemical Society (J. Am. Chem. Soc.), 116, 7943 (1994)), the process employing a radical scavenger, e.g. a nitroxide compound, as described in Macromolecules, 27, 7228 (1994), and the process using an organohalogen compound as the initiator and a transition metal complex as the catalyst which is called Atom Transfer Radical Polymerization (ATRP) can be mentioned.

Among versions of the "living radical polymerization method", the "atom transfer radical polymerization process" using an organohalogen compound or a halosulfonyl compound as the initiator and a transition metal complex as the catalyst for the polymerization of a vinyl monomer offers the advantage, in addition to above-mentioned beneficial features of "living radical polymerization method" in general, that the terminal group involved is a halogen which is comparatively advantageous for functional group transformation and provides for a greater freedom in the initiator and catalyst design and, therefore, this process is still more preferred for the production of a vinyl polymer having a defined functional group. The specific procedures for atom transfer radical polymerization are described in inter alia Matyjaszewski et al.: Journal of American Chemical Society (J. Am. Chem. Soc.), 117, 5614 (1995), Macromolecules, 28, 7901 (1995), Science, 272, 866 (1996), WO 96/30421, WO 97/18247, and Sawamoto et al.: Macromolecules, 28, 1721 (1995).

It is virtually up to one's discretion which of the above alternative methods is employed for the practice of the present invention but in view of the ease of reaction control, the atom transfer radical polymerization method is preferred.

Among these living radical polymerization methods, the process using a radical scavenger such as a nitroxide compound is first described. For this polymerization reaction, a nitroxy free radical (=N—O.), which is stable, is generally used as a radical capping agent. Such a compound is not particularly restricted but includes nitroxy free radicals from cyclic hydroxylamines, such as 2,2,6,6-substituted-1-piperidinyloxy radicals and 2,2,5,5-substituted-1-pyrrolidinyloxy radicals. Suitable substituents are alkyl groups of not more than 4 carbon atoms, such as methyl, ethyl, etc. Specific nitroxy free radical compounds are not particularly restricted but include, among others, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-t-butylaminoxy radical. In lieu of nitroxy free radicals, other stable free radicals such as galvinoxyl free radicals can also be used.

The radical capping agent is used in combination with a radical donor. It is suspected that as the reaction product of such a radical capping agent with a radical donor functions as a polymerization initiator, polymerization of an addition-polymerizable monomer proceeds. The relative amount of the two reagents is not particularly restricted but the molar ratio of radical capping agent to radical donor is preferably 1:(0.1 to 10).

As the radical donor, a variety of compounds can be employed but it is preferable to use a peroxide which is capable of liberating a radical at the polymerization temperature. The peroxide is not particularly restricted but includes diacyl peroxides such as benzoyl peroxide, lauroyl peroxide, etc., dialkyl peroxides such as dicumyl peroxide, di-t-butyl peroxide, etc., peroxycarbonates such as diisopropyl peroxydicarbonate, bis(4-t-butylcyclohexyl) peroxydicarbonate, etc.; and alkyl peresters such as t-butyl peroxyoctoate, t-butyl peroxybenzoate, etc. The particularly preferred peroxide is benzoyl peroxide. Optionally, a radical-liberating azo compound such as azobisisobutyronitrile, for instance, may be used in lieu of said peroxide.

As reported in Macromolecules, 28, 2993 (1995), alkoxyamine compounds such as those shown below may be used in lieu of the combination of a radical capping agent and a radical donor.

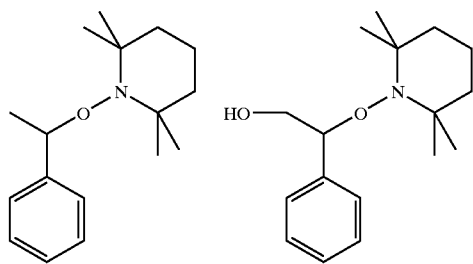

In the polymerization reaction using an alkoxyamine compound as the initiator, the use of a compound having a functional group, e.g. a hydroxyl group as typically illustrated above, results in formation of a polymer terminally having the particular functional group. When such a compound is used in the method of the present invention, a stellate polymer having functional groups in terminal positions is obtained.

The monomer, solvent, temperature and other conditions for the polymerization reaction employing a radical scavenger such as said nitroxide compound are not particularly restricted but may be similar to the conditions for the atom transfer radical polymerization to be described below.

Thus, the atom transfer radical polymerization method which is a still more preferred mode of the living radical polymerization according to the present invention is now described.

In the atom transfer radical polymerization method, an organohalogen compound, particularly an organohalogen compound having a highly reactive carbon-halogen bond [for example, an ester compound having a halogen atom on the α-carbon or a compound having a halogen atom on the benzyl group], or a halosulfonyl compound is used as the initiator. The catalyst is a metal complex the central metal of which is selected from among the elements belonging to the group 7, 8, 9, 10 or 11 of the periodic table of the elements. As metal species, zero-valent copper, monovalent copper, divalent ruthenium and divalent iron are particularly preferred. To mention specific examples, there may be cuprous chloride, cuprous bromide, cuprous iodide, cuprous cyanide, cuprous oxide, cuprous acetate and cuprous perchlorate. When a copper compound is used, there is added such a ligand as 2,2'-bipyridyl or a derivative thereof, 1,10-phenanthrophosphorus or a derivative thereof, an alkylamine such as tributylamine, or a polyamine such as tetramethylethylenediamine, pentamethyldiethylenetriamine, hexamethyltriethylenetetraamine or the like for improved catalytic activity. The tris (triphenylphosphine) complex of ruthenium (II) chloride ($RuCl_2(PPh_3)_3$) is also a usual catalyst. When a ruthenium compound is used as the catalyst, an aluminum compound such as a trialkoxy-aluminum is added in order to improve its activity. In addition, tris(triphenylphosphine) iron (II) chloride complex ($FeCl_2(PPh_3)_3$) is also suitable catalysts.

In this polymerization process, an organohalogen or halosulfonyl compound is used as an initiator. To mention specific examples, there may be mentioned:

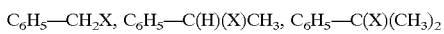

(in each of the above formulas, $C_6H_5$ represents phenyl; X represents chloro, bromo or iodo),

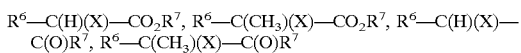

(in each of these formulas, $R^6$ and $R^7$ each represents hydrogen or an alkyl, aryl or aralkyl group of up to 20 carbon atoms; X represents chloro, bromo or iodo),

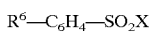

(wherein $R^6$ represents hydrogen or an alkyl, aryl or aralkyl group of up to 20 carbon atoms; X represents chloro, bromo or iodo), among others.

The use of an organohalogen or halosulfonyl compound having a functional group as the initiator is preferable, for a polymer having the functional group introduced into the terminal position can then be easily obtained. As said functional group, there can be mentioned an alkenyl group, a hydroxyl group, an epoxy group, an amino group, an amide group or a silyl group. In particular, the use of an initiator having a hydroxyl group is preferred. However, when an initiator having an alkenyl group is used, a reaction similar to the coupling reaction according to the invention may take place between the polymer propagation end and the alkenyl group of the initiator. In such cases, since the number of polymer propagation ends may have been decreased as compared with the number of moles of the initiator at the time of addition of the coupling agent, the amount of use of the coupling agent should be selected taking this fact into consideration. The chief objective of using an initiator having an alkenyl group is to synthesize an alkenyl-terminated polymer, and for accomplishing this objective, it is preferable to add an excess of a compound like the coupling agent of the invention relative to the polymer propagation ends.

The organohalogen compound having an alkenyl group is not particularly restricted but includes, among others, compounds having a structure represented by the general formula (6):

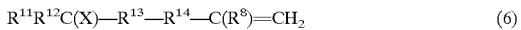

(wherein $R^8$ represents hydrogen or methyl; $R^{11}$ and $R^{12}$ each represents hydrogen or an alkyl, aryl or aralkyl group of up to 20 carbon atoms or jointly represent a ring formed by coupling to each other at the other ends; $R^{13}$ represents —C(O)O— (ester group), —C(O)— (keto group), or an o-, m- or p-phenylene group; $R^{14}$ represents a direct bond or a divalent organic group containing 1 to 20 carbon atoms and optionally containing one or more ether bonds; X represents chloro, bromo or iodo).

In these compounds, the carbon to which the halogen is attached is bound to a carbonyl or phenyl group so that the carbon-halogen bond is activated to induce polymerization.

The substituents $R^{11}$ and $R^{12}$ each may be selected from among such specific groups as hydrogen, methyl, ethyl, n-propyl, isopropyl, n-butyl, pentyl and hexyl, among others. $R^{11}$ and $R^{12}$ may optionally be coupled to each other at the other ends to form a cyclic skeleton, and, in such cases, —$R^{11}$—$R^{12}$— may for example be —$CH_2CH_2$—, —$CH_2CH_2CH_2$—, —$CH_2CH_2CH_2CH_2$— or —$CH_2CH_2CH_2CH_2CH_2$—.

As specific examples of the organohalogen compound having an alkenyl group as represented by the general formula (6), there can be mentioned the following:

$XCH_2C(O)O(CH_2)_nCH=CH_2$, $H_3CC(H)(X)C(O)O(CH_2)_nCH=CH_2$, $(H_3C)_2C(X)C(O)O(CH_2)_nCH=CH_2$, $CH_3CH_2C(H)(X)C(O)O(CH_2)_nCH=CH_2$,

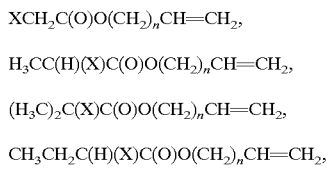

(in each of the above formulas, X represents chloro, bromo or iodo; n represents an integer of 0 to 20), $XCH_2C(O)O(CH_2)_nO(CH_2)_mCH=CH_2$, $H_3CC(H)(X)C(O)O(CH_2)_nO(CH_2)_mCH=CH_2$, $(H_3C)_2C(X)C(O)O(CH_2)_nO(CH_2)_mCH=CH_2$, $CH_3CH_2C(H)(X)C(O)O(CH_2)_nO(CH_2)_mCH=CH_2$,

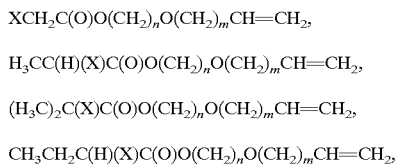

(in each of the above formulas, X represents chloro, bromo or iodo; n represents an integer of 1 to 20, and m represents an integer of 0 to 20), o, m, or p-$XCH_2$—$C_6H_4$—$(CH_2)_n$—$CH=CH_2$, o, m, or p-$CH_3C(H)(X)$—$C_6H_4$—$(CH_2)_n$—$CH=CH_2$, o, m, or p-$CH_3CH_2C(H)(X)$—$C_6H_4$—$(CH_2)_n$—$CH=CH_2$, (in each of the above formulas, X represents chloro, bromo or iodo; n represents an integer of 0 to 20), o, m, or p-$XCH_2$—$C_6H_4$—$(CH_2)_n$—O—$(CH_2)_m$—$CH=CH_2$, o, m, or p-$CH_3C(H)(X)$—$C_6H_4$—$(CH_2)_n$—O—$(CH_2)_m$—$CH=CH_2$, o, m, or p-$CH_3CH_2C(H)(X)$—$C_6H_4$—$(CH_2)_n$—O—$(CH_2)_m$—$CH=CH_2$, (in each of the above formulas, X represents chloro, bromo or iodo; n represents an integer of 1 to 20, and m represents an integer of 0 to 20), o, m, or p-$XCH_2$—$C_6H_4$—O—$(CH_2)_n$—$CH=CH_2$, o, m, or p-$CH_3C(H)(X)$—$C_6H_4$—O—$(CH_2)_n$—$CH=CH_2$, o, m, or p-$CH_3CH_2C(H)(X)$—$C_6H_4$—O—$(CH_2)_n$—$CH=CH_2$, (in each of the above formulas, X represents chloro, bromo or iodo; n represents an integer of 0 to 20), o, m, or p-$XCH_2$—$C_6H_4$—O—$(CH_2)_n$—O—$(CH_2)_m$—$CH=CH_2$, o, m, or p-$CH_3C(H)(X)$—$C_6H_4$—O—$(CH_2)_n$—O—$(CH_2)_m$—$CH=CH_2$, o, m, or p-$CH_3CH_2C(H)(X)$—$C_6H_4$—O—$(CH_2)_n$—O—$(CH_2)_m$—$CH=CH_2$, (in each of the above formulas, X represents chloro, bromo or iodo; n represents an integer of 1 to 20, and m represents an integer of 0 to 20).

As further examples of the organohalide having an alkenyl group, the compound of the general formula (7) can be mentioned:

$$H_2C=C(R^8)-R^{14}-C(R^{11})(X)-R^{15}-R^{12} \qquad (7)$$

(wherein $R^8$, $R^{11}$, $R^{12}$, $R^{14}$ and X are respectively as defined hereinbefore; $R^{15}$ represents a direct bond, —C(O)O— (ester group), —C(O)— (keto group), or an o-, m- or p-phenylene group).

$R^{14}$ is a direct bond or a divalent organic group of 1 to 20 carbon atoms (optionally containing one or more ether bond). In case it is a direct bond, the vinyl group is bound to the carbon on which the halogen is present, so that an allyl halide compound is formed. In this case, the carbon-halogen bond has been activated by the adjacent vinyl group, so that it is not necessary for $R^{15}$ to have C(O)O, phenylene or the like. In case $R^{14}$ is not a direct bond, $R^{15}$ is preferably a C(O)O, C(O) or phenylene group in order that the carbon-halogen bond may be activated.

Specific examples of the compound of the general formula (7) are shown in the following:

$CH_2=CHCH_2X$, $CH_2=C(CH_3)CH_2X$, $CH_2=CHC(H)(X)CH_3$, $CH_2=C(CH_3)C(H)(X)CH_3$, $CH_2=CHC(X)(CH_3)_2$, $CH_2=CHC(H)(X)C_2H_5$, $CH_2=CHC(H)(X)CH(CH_3)_2$, $CH_2=CHC(H)(X)C_6H_5$, $CH_2=CHC(H)(X)CH_2C_6H_5$, $CH_2=CHCH_2C(H)(X)$—$CO_2R$, $CH_2=CH(CH_2)_2C(H)(X)$—$CO_2R$, $CH_2=CH(CH_2)_3C(H)(X)$—$CO_2R$, $CH_2=CH(CH_2)_8C(H)(X)$—$CO_2R$, $CH_2=CHCH_2C(H)(X)$—$C_6H_5$, $CH_2=CH(CH_2)_2C(H)(X)$—$C_6H_5$, $CH_2=CH(CH_2)_3C(H)(X)$—$C_6H_5$, (In each of the above formulas, X represents chloro, bromo or iodo; R represents an alkyl, aryl or aralkyl group of up to 20 carbon atoms).

The halosulfonyl compound having an alkenyl group includes, among others:

o-, m-, or p-$CH_2=CH$—$(CH_2)_n$—$C_6H_4$—$SO_2X$, o-, m-, or p-$CH_2=CH$—$(CH_2)_n$—O—$C_6H_4$—$SO_2X$, (In each of the above formulas, X represents chloro, bromo or iodo; n is an integer of 0 to 20).

When the initiator has an alkenyl group, the initiator olefin may also react with the polymer propagation end. Therefore, attention must be paid to polymerization conditions and reaction conditions for the olefin compound to be added, among other factors. For example, the addition of the olefin compound in an early phase of polymerization should be considered.

The organohalogen compound having a crosslinkable silyl group is not particularly restricted, but includes compounds having a structure represented by the general formula (8):

$$R^{11}R^{12}C(X)-R^{13}-R^{14}-C(H)(R^8)CH_2-[Si(R^{16})_{2-b}(Y)_bO]_m-Si(R^{17})_{3-a}(Y)_a \quad (8)$$

(wherein $R^8$, $R^{11}$, $R^{12}$, $R^{13}$, $R^{14}$, $R^{16}$, $R^{17}$, a, b, m, X and Y are respectively as defined above).

Specific examples of the compound of the general formula (8) are shown in the following:

$XCH_2C(O)O(CH_2)_nSi(OCH_3)_3$,
$CH_3C(H)(X)C(O)O(CH_2)_nSi(OCH_3)_3$, $(CH_3)_2C(X)C(O)O(CH_2)_nSi(OCH_3)_3$,
$XCH_2C(O)O(CH_2)_nSi(CH_3)(OCH_3)_2$, $CH_3C(H)(X) C(O)O(CH_2)_nSi(CH_3)(OCH_3)_2$, $(CH_3)_2C(X)C(O)O(CH_2)_nSi(CH_3)(OCH_3)_2$ (in each of the above formulas, X represents chloro, bromo or iodo; n represents an integer of 0 to 20), $XCH_2C(O)O(CH_2)_nO(CH_2)_mSi(OCH_3)_3$, $H_3CC(H)(X)C(O)O(CH_2)_nO(CH_2)_mSi(OCH_3)_3$, $(H_3C)_2C(X)C(O)O(CH_2)_nO(CH_2)_mSi(OCH_3)_3$, $CH_3CH_2C(H)(X)C(O)O(CH_2)_nO(CH_2)_mSi(OCH_3)_3$, $XCH_2C(O)O(CH_2)_nO(CH_2)_mSi(CH_3)(OCH_3)_2$, $H_3CC(H)(X)C(O)O(CH_2)_nO(CH_2)_mSi(CH_3)(OCH_3)_2$, $(H_3C)_2C(X)C(O)O(CH_2)_nO(CH_2)_mSi(CH_3)(OCH_3)_2$, $CH_3CH_2C(H)(X)C(O)O(CH_2)_nO(CH_2)_mSi(CH_3)(OCH_3)_2$, (in each of the above formulas, X represents chloro, bromo or iodo, n represents an integer of 1 to 20; m represents an integer of 0 to 20), o, m, or p-$XCH_2-C_6H_4-(CH_2)_2Si(OCH_3)_3$, o, m, or p-$CH_3C(H)(X)-C_6H_4-(CH_2)_2Si(OCH_3)_3$, o, m, or p-$CH_3CH_2C(H)(X)-C_6H_4-(CH_2)_2Si(OCH_3)_3$, o, m, or p-$XCH_2-C_6H_4-(CH_2)_3Si(OCH_3)_3$, o, m, or p-$CH_3C(H)(X)-C_6H_4-(CH_2)_3Si(OCH_3)_3$, o, m, or p-$CH_3CH_2C(H)(X)-C_6H_4-(CH_2)_3Si(OCH_3)_3$, o, m, or p-$XCH_2-C_6H_4-(CH_2)_2-O-(CH_2)_3Si(OCH_3)_3$, o, m, or p-$CH_3C(H)(X)-C_6H_4-(CH_2)_2-O-(CH_2)_3Si(OCH_3)_3$, o, m, or p-$CH_3CH_2C(H)(X)-C_6H_4-(CH_2)_2-O-(CH_2)_3Si(OCH_3)_3$, o, m, or p-$XCH_2-C_6H_4-O-(CH_2)_3Si(OCH_3)_3$, o, m, or p-$CH_3C(H)(X)-C_6H_4-O-(CH_2)_3Si(OCH_3)_3$, o, m, or p-$CH_3CH_2C(H)(X)-C_6H_4-O-(CH_2)_3Si(OCH_3)_3$, o, m, or p-$XCH_2-C_6H_4-O-(CH_2)_2-O-(CH_2)_3Si(OCH_3)_3$, o, m, or p-$CH_3C(H)(X)-C_6H_4-O-(CH_2)_2-O-(CH_2)_3Si(OCH_3)_3$, o, m, or p-$CH_3CH_2C(H)(X)-C_6H_4-O-(CH_2)_2-O-(CH_2)_3Si(OCH_3)_3$, (in each of the above formulas, X represents chloro, bromo or iodo).

The organohalogen compound having a crosslinkable silyl group further includes compounds having the structure represented by the general formula (9):

$$(R^{17})_{3-a}(Y)_aSi-[OSi(R^{16})_{2-b}(Y)_b]_m-CH_2-C(H)(R^8)-R^{14}-C(R^{11})(X)-R^{15}-R^{12} \quad (9)$$

(wherein $R^8$, $R^{11}$, $R^{12}$, $R^{14}$, $R^{15}$, $R^{16}$, $R^{17}$, a, b, m, X and Y are respectively as defined above).

Specific examples of such compounds are shown in the following;

$(CH_3O)_3SiCH_2CH_2C(H)(X)C_6H_5$,
$(CH_3O)_2(CH_3)SiCH_2CH_2C(H)(X)C_6H_5$, $(CH_3O)_3Si(CH_2)_2C(H)(X)-CO_2R$,
$(CH_3O)_2(CH_3)Si(CH_2)_2C(H)(X)-CO_2R$, $(CH_3O)_3Si(CH_2)_3C(H)(X)-CO_2R$,
$(CH_3O)_2(CH_3)Si(CH_2)_3C(H)(X)-CO_2R$, $(CH_3O)_3Si(CH_2)_4C(H)(X)-CO_2R$,
$(CH_3O)_2(CH_3)Si(CH_2)_4C(H)(X)-CO_2R$, $(CH_3O)_3Si(CH_2)_9C(H)(X)-CO_2R$,
$(CH_3O)_2(CH_3)Si(CH_2)_9C(H)(X)-CO_2R$, $(CH_3O)_3Si(CH_2)_3C(H)(X)-C_6H_5$,
$(CH_3O)_2(CH_3)Si(CH_2)_3C(H)(X)-C_6H_5$, $(CH_3O)_3Si(CH_2)_4C(H)(X)-C_6H_5$,
$(CH_3O)_2(CH_3)Si(CH_2)_4C(H)(X)-C_6H_5$, (in each of the above formulas, X represents chloro, bromo or iodo; R represents an alkyl, aryl or aralkyl group of up to 20 carbon atoms).

The organohalogen compound or halosulfonyl compound having a hydroxyl group is not particularly restricted but includes the following, among others:

$$HO-(CH_2)_n-OC(O)C(H)(R)(X)$$

(wherein X represents chloro, bromo or iodo; R represents hydrogen or an alkyl, aryl or aralkyl group of up to 20 carbon atoms; n represents an integer of 1 to 20).

The organohalogen compound or halosulfonyl compound having an amino group is not particularly restricted but includes the following, among others:

$$H_2N-(CH_2)_n-OC(O)C(H)(R)(X)$$

(wherein X represents chloro, bromo or iodo; R represents hydrogen or an alkyl, aryl or aralkyl group of up to 20 carbon atoms; n represents an integer of 1 to 20).

The organohalide compound or halosulfonyl compound having an epoxy group is not particularly restricted but includes the following, among others:

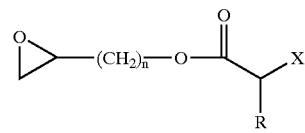

(wherein X represents chloro, bromo or iodo; R represents hydrogen or an alkyl, aryl or aralkyl group of 1 to 20 carbon atoms; n represents an integer of 1 to 20).

In order to obtain a polymer having two or more units of the olefinic terminal structure according to the invention, it is preferable to use, as an intiator, an organohalogen compound or halosulfonyl compound having two or more initiation points. More particularly, there can be mentioned the following compounds as examples:

o, m, p- X—CH$_2$—C$_6$H$_4$—CH$_2$—X

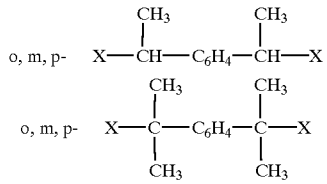

(wherein C$_6$H$_4$ represents a phenylene group; X represents chloro, bromo or iodo),

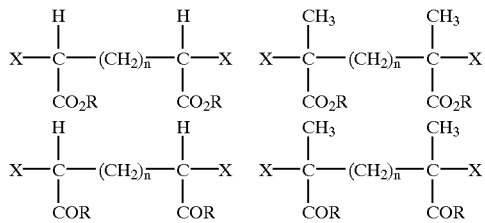

(wherein R represents an alkyl, aryl or aralkyl group of up to 20 carbon atoms; n represents an integer of 0 to 20; X represents chloro, bromo or iodo),

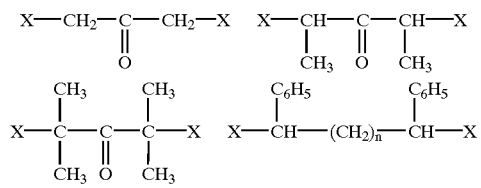

(wherein X represents chloro, bromo or iodo; n represents an integer of 0 to 20),

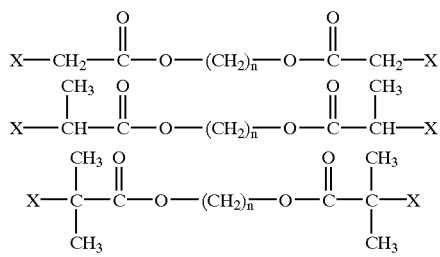

(wherein n represents an integer of 0 to 20; X represents chloro, bromo or iodo),

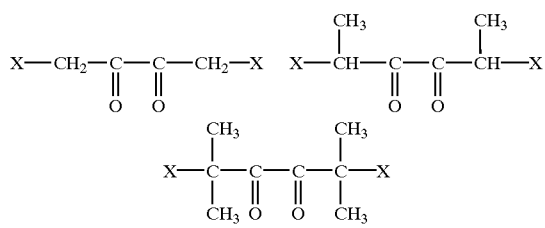

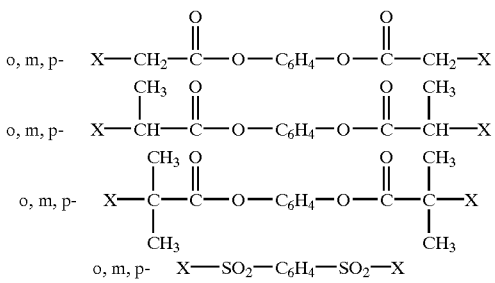

o, m, p- X—SO$_2$—C$_6$H$_4$—SO$_2$—X (wherein X represents chloro, bromo or iodo).

The polymerizable olefin monomer for use in this polymerization process is not particularly restricted but a variety of monomers can be employed. Moreover, because the polymerization schema involved is living polymerization, a block copolymer can also be produced by serial addition of polymerizable monomers. As examples, there can be mentioned (meth)acrylic monomers such as (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate, phenyl(meth)acrylate, tolyl(meth)acrylate, benzyl(meth)acrylate, 2-methoxyethyl(meth)acrylate, 3methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, adduct of (meth)acrylic acid and ethylene oxide, trifluoromethylmethyl (meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl (meth)acrylate, 2-perfluorodecylethyl(meth)acrylate, 2-perfluorohexadecylethyl(meth)acrylate, etc.; styrenic monomers such as styrene, vinyltoluene, α-methylstyrene, chlorostyrene, styrenesulfonic acid and its salt; fluorine-containing vinyl monomers such as perfluoroethylene, perfluoropropylene, vinylidene fluoride, etc.; silicon-containing vinyl monomers such as vinyltrimethoxysilane, vinyltriethoxysilane, etc.; maleic anhydride, maleic acid, monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide, etc.; nitrile-containing vinyl monomers such as acrylonitrile, methacrylonitrile, etc.; amide-containing vinyl monomers such as acrylamide, methacrylamide, etc.; vinyl esters such as vinyl acetate, vinyl propionate, vinyl pivalate, vinyl benzoate, vinyl cinnamate, etc.; alkenes such as ethylene, propylene, etc.; conjugated dienes such as butadiene, isoprene, etc.; vinyl chloride, vinylidene chloride, allyl chloride and allyl alcohol. These monomers may be used each alone or a plurality of them may be copolymerized. Among these monomers, α, β-unsaturated carboxylic acid series monomers are preferred in view of their high response to functional group-introducing reactions and their low glass transition temperatures. The more preferred monomers are (meth)acrylic monomers and the still more preferred are acrylic monomers. The particularly preferred monomers are acrylate monomers and the most preferred is butyl acrylate.

Since the coupling reaction according to the present invention is particularly advantageous in the polymerization of acrylic monomers as mentioned above, an acrylic monomer may be added as a comonomer advantageously in the course of polymerization of a different monomer or, more preferably, at the time of inducing a coupling reaction.

The polymerization can be conducted in the absence of a solvent or in any of various solvents. The solvent is not particularly restricted but includes hydrocarbon series solvents such as benzene, toluene, etc.; ether series solvents such as diethyl ether, tetrahydrofuran, etc.; halogenated hydrocarbon series solvents such as methylene chloride, chloroform, etc.; ketone series solvents such as acetone, methyl ethyl ketone, methyl isobutyl ketone, etc., alcohol series solvents such as methanol, ethanol, propanol, isopropyl alcohol, n-butyl alcohol, tert-butyl alcohol, etc.; nitrile series solvents such as acetonitrile, propionitrile, benzonitrile, etc.; ester series solvents such as ethyl acetate, butyl acetate, etc.; and carbonate series solvents such as ethylene carbonate, propylene carbonate, etc., among others. These solvents can be used each alone or as a mixture of 2 or more species.

The reaction temperature is not particularly restricted but the polymerization reaction can be carried out within the temperature range of 0 to 200° C., preferably 50 to 150° C.

In accordance with the present invention, a compound having at least two sparingly radical-polymerizable alkenyl groups is added in the course of such living polymerization or at the time of completion of the polymerization. By this addition, one of said at least two alkenyl groups reacts with one polymer propagation end to introduce the other unreacted alkenyl group. Therefore, this unreacted alkenyl group reacts with another polymer propagation end to effect coupling between the two polymer chain ends. The time of completion of polymerization is the time when preferably at least 80%, more preferably at least 90%, of the charged monomer has reacted.

The addition amount of the compound having at least two sparingly radical-polymerizable alkenyl groups in the present invention is not particularly restricted but the amount of sparingly radical-polymerizable alkenyl functional group should not be more than equimolar to the propagation ends. If the addition amount is more than equimolar, only a limited number of the alkenyl groups available from said compound having at least two sparingly radical-polymerizable alkenyl groups may react with the polymer propagation ends so that the polymer-polymer coupling may not proceed sufficiently: the addition of an equimolar or excess amount of said compound is suitable when the objective polymer is an alkenyl group-terminated polymer, but otherwise addition of more than an equimolar amount is preferably avoided. When the addition amount is too low, some propagation ends cannot undergo coupling, although this is permissible when only partial coupling is necessary. Therefore, the addition amount of said compound having two or more sparingly radical-polymerizable alkenyl groups is preferably 0.5 to 1.0, more preferably 0.8 to 1.0, still more preferably 0.9 to 1.0, in terms of the ratio of alkenyl groups to the polymer propagation ends.

The present invention is further concerned with a polymer as obtainable by the method of the present invention.

The polymer as obtainable by the method of the present invention is not particularly restricted but may for example be a polymer having a group represented by the following general formula (4):

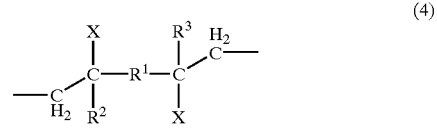

(4)

[wherein $R^1$ represents a divalent or polyvalent saturated hydrocarbon group containing 1 to 20 carbon atoms or a group represented by the following general formula (5):

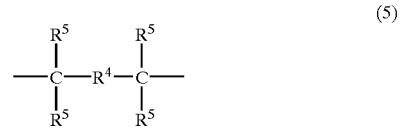

(5)

(wherein $R^4$ represents an oxygen atom, a nitrogen atom, or a divalent or polyvalent organic group containing 1 to 20 carbon atoms; $R^5$ represents a monovalent group, preferably a hydrogen atom or a methyl group, and 4 $R^5$s may be the same or different); $R^2$ and $R^3$ are the same or different and each represents a hydrogen atom or a methyl group; X represents halogen, a nitroxide group, a sulfide group or a cobalt porphyrin complex].

$R^1$, $R^2$, $R^3$, $R^4$ and $R^5$ in the above general formulas (4) and (5) are respectively as defined in the general formula (1).

The divalent or polyvalent saturated hydrocarbon group of 1 to 20 carbon atoms as mentioned above for $R^1$ is not particularly restricted but includes alkylene groups such as methylene, ethylene, propylene, butylene, pentylene, etc. and trivalent saturated hydrocarbon groups such as methine, ethanetriyl, propanetriyl, etc. The preferred are alkylene groups of the following formula:

(wherein n represents an integer of 1 to 20). From availability points of view, n is preferably equal to 2, 4 or 6.

Referring to the above general formula (5), $R^4$ represents an oxygen atom, a nitrogen atom or a divalent or polyvalent organic group containing 1 to 20 carbon atoms. The divalent or polyvalent organic group containing 1 to 20 carbon atoms is not particularly restricted but includes divalent organic groups such as —$CH_2$—O—$CH_2$—, —$CH_2$—NH—$CH_2$—, —$CH_2C(O)O$—, phenylene, etc. and trivalent organic groups such as phenyllysine. $R^5$ represents a monovalent group, preferably a hydrogen atom or a methyl group, and 4 $R^5$s may be the same or different. The group represented by the above general formula (5) preferably includes the following:

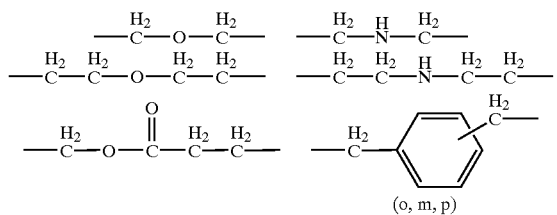

Referring to the general formula (4), $R^2$ and $R^3$ are the same or different and each represents a hydrogen atom or a methyl group, although a hydrogen atom is preferred. X represents a halogen atom, a nitroxide group, a sulfide group or a cobalt porphyrin complex but, in view of the ease of production, is preferably a halogen atom.

When $R^1$ in the above general formula (4) is a trivalent or polyvalent group, the group of the formula (4) has the corresponding number of polymer chains. The number of such polymer chains is not particularly restricted but when it is 3 or more and the available polymer propagation end number is 2 or more, it is likely that the polymer forms a network structure to undergo gelation.

The number of groups of the above general formula (4) per molecule of the polymer of the invention is not particularly restricted.

The polymer produced in accordance with the present invention can be utilized in the fields of plastic molding materials, plastic impact resistance improving agents, lubricating oil rheology modifiers, thermoplastic elastomers and so forth. In the case of a polymer having a terminal functional group, a cured product can be obtained by a crosslinking reaction utilizing the functional group as it is or after transformation thereof to a condensible silyl or other functional group. As specific uses for such polymers, there can be mentioned sealants, adhesives, self-adhesives, elastic adhesives, paints, powder coatings, foams, electric/electronic potting materials, films, gaskets, various molding compounds and artificial marble.

BEST MODE FOR CARRYING OUT THE INVENTION

The following examples illustrate the present invention in further detail without defining the scope of the invention.

EXAMPLE 1

A 30 mL glass reactor was charged with butyl acrylate (10.0 mL, 8.94 g, 69.75 mmol), copper (I) bromide (250 mg, 1.74 mmol), pentainethyldiethylenetriamine (0.364 mL, 302 mg, 1.74 mmol) and toluene (1 mL), and after degassing by decompression, the internal atmosphere was replaced with nitrogen gas. After thorough stirring, 2-hydroxyethyl 2-bromopropionate (3.44 mL, 1.74 mmol) was added and the mixture was stirred under heating at 70° C. After 75 minutes, 1,9-decadiene (0.14 mL, 109 mg, 0.78 mmol) was added and the mixture was heated at 70° C. with constant stirring for 7 hours. This mixture was treated with activated alumina. GPC analysis (polystyrene equivalent method) of the resulting polymer showed that the number average molecular weight and molecular weight distribution of the polymer immediately before addition of 1,9-decadiene were Mn=5600 and Mw/Mn=1.24, respectively, and that the number average molecular weight and molecular weight distribution of the final polymer were Mn=7700 and Mw/Mn=1.37, respectively.

EXAMPLE 2

Under nitrogen in a 100 mL glass reactor, butyl acrylate (50.0 mL, 44.7 g, 348.9 mmol) was polymerized using diethyl 2,5-dibromoadipate (1.570 g, 4.36 mmol) as the initiator and copper (I) bromide and pentamethyldiethylenetriamine as the catalyst at 70° C. with stirring. After 100 minutes, 1,7-octadiene (0.64 mL, 480 mg, 4.36 mmol) was added and the mixture was further stirred under heating at 70° C. for 300 minutes. The mixture was treated with activated alumina. GPC analysis (polystyrene equivalent method) of the resulting polymer revealed that the number average molecular weight and weight average molecular weight immediately prior to addition of 1,7-octadiene were Mn=10400 and Mw=13100, respectively, and that the final number average molecular weight and weight average molecular weight were Mn=13600 and Mw=19100, indicating the occurrence of coupling reactions.

INDUSTRIAL APPLICABILITY

In the present invention, by adding a compound having at least two alkenyl groups in the molecule, as defined herein, to a living radical polymerization system in an amount corresponding to not more than an equimolar proportion of alkenyl functional group relative to polymer propagation ends, coupled polymers can be easily produced from various radical-polymerizable olefin monomers. The polymer produced from a radical-polymerizable olefin monomer by the technology of the present invention is stable because of the coupling of polymers via carbon-carbon bonding in a preferred mode and, moreover, the terminal groups have been well coordinated with the initiator. Therefore, the product polymer is useful for curable compositions and other applications.

What is claimed is:

1. A method of effecting polymer-polymer coupling in the living radical polymerization of a radical-polymerizable olefin monomer which comprises adding a compound having at least two sparingly radical-polymerizable alkenyl groups during or after the polymerization.

2. The method according to claim 1 wherein said compound having at least two sparingly radical-polymeriable alkenyl groups to be added is of the general formula (1):

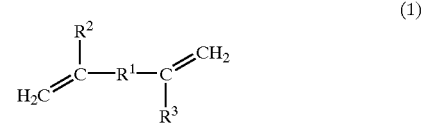

(1)

wherein $R^1$ represents a divalent or polyvalent saturated hydrocarbon group of 1 to 20 carbon atoms or a group of the general formula (2):

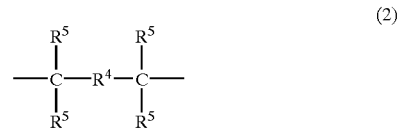

(2)

wherein $R^4$ represents an oxygen atom, a nitrogen atom or a divalent or polyvalent organic group containing 1 to 20 carbon atoms; $R^5$ represents a monovalent group; 4 $R^5$s may be the same or different; $R^2$ and $R^3$ are the same or different and each represents a hydrogen atom or a methyl group.

3. The method according to claim 2 wherein $R^1$ in the general formula (1) represents an alkylene group of 1 to 20 carbon atoms.

4. The method according to claim 2 wherein the compound having at least two sparingly radical-polymerizable alkenyl groups to be added is of the general formula (3):

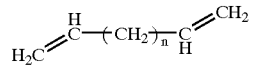
(3)

wherein n represents an integer of 1 to 20.

5. The method according to claim 4 wherein the compound having at least two sparingly radical-polymerizable alkenyl groups to be added is selected from the group consisting of 1,5-hexadiene, 1,7-octadiene and 1,9-decadiene.

6. The method according to claim 1 wherein the living radical polymerization is atom transfer radical polymerization.

7. The method according to claim 6 wherein a catalyst for said atom transfer radical polymerization comprises a metal complex, said metal complex having the central metal selected from an element belonging to the group 7, 8, 9, 10 or 11 of the periodic table of the elements.

8. The method according to claim 7 wherein said catalyst for atom transfer radical polymerization is a complex of a metal selected from the group consisting of copper, nickel, ruthenium and iron.

9. The method according to claim 1 wherein an initiator for said atom transfer radical polymerization is a functional group-containing organohalogen compound or a functional group-containing halosulfonyl compound.

10. The method according to claim 9 wherein said functional group is a hydroxyl group or a hydrolyzable silyl group.

11. The method according to claim 1 wherein the radical-polymerizable olefin monomer is an α, β-unsaturated carboxylic acid series monomer.

12. The method according to claim 11 wherein the radical-polymerizable olefin monomer is a (meth)acrylic monomer.

13. The method according to claim 12 wherein the radical-polymerizable olefin monomer is an acrylic monomer.

14. The method according to claim 13 wherein the radical-polymerizable olefin monomer is an acrylate monomer.

15. The method according to claim 14 wherein the radical-polymerizable olefin monomer is butyl acrylate.

16. A polymer obtainable by the method according to claim 1.

17. The polymer according to claim 16 having a group of the general formula (4) within its molecule:

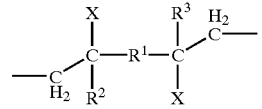
(4)

wherein $R^1$ represents a divalent or polyvalent saturated hydrocarbon group containing 1 to 20 carbon atoms or a group represented by the general formula (5):

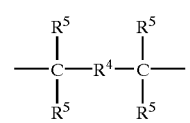
(5)

wherein $R^4$ represents an oxygen atom, a nitrogen atom, or a divalent or polyvalent organic group containing 1 to 20 carbon atoms; $R^5$ represents a monovalent group, and 4 $R^5$s may be the same or different; $R^2$ and $R^3$ are the same or different and each represents a hydrogen atom or a methyl group; X represents halogen, a nitroxide group, a sulfide group or a cobalt porphyrin complex.

18. The method according to claim 3 wherein the compound having at least two sparingly radical-polymerizable alkenyl groups to be added is of the general formula (3):

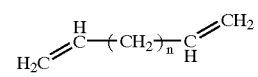
(3)

wherein n represents an integer of 1 to 20.

19. The method according to claim 2 wherein the living radical polymerization is atom transfer radical polymerization.

20. The method according to claim 3 wherein the living radical polymerization is atom transfer radical polymerization.

21. The method according to claim 2 wherein $R^5$ is hydrogen atom or methyl group.

22. The polymer according to claim 17 wherein $R^5$ is hydrogen atom or methyl group.

* * * * *

UNITED STATES PATENT AND TRADEMARK OFFICE
CERTIFICATE OF CORRECTION

PATENT NO. : 6,649,701 B1  
DATED : November 18, 2003  
INVENTOR(S) : Yoshiki Nakagawa et al.

It is certified that error appears in the above-identified patent and that said Letters Patent is hereby corrected as shown below:

<u>Column 18,</u>  
Line 38, "radical-polymeriable" should read -- radical-polymerizable --.

Signed and Sealed this

Thirty-first Day of August, 2004

JON W. DUDAS  
*Director of the United States Patent and Trademark Office*